United States Patent [19]

Kobayashi et al.

[11] 4,004,290
[45] Jan. 18, 1977

[54] METHOD AND APPARATUS FOR JUDGING PSYCHOSOMATIC CONDITION OF THE DRIVER IN MOTOR VEHICLE

[75] Inventors: Kazuo Kobayashi; Seiichi Sugiura; Yoshimasa Oosumi, all of Shizuoka, Japan

[73] Assignee: Toyota Jidosha Kogyo Kabushiki Kaisha, Toyota, Japan

[22] Filed: Aug. 19, 1975

[21] Appl. No.: 605,961

[30] Foreign Application Priority Data

Aug. 28, 1974 Japan .............................. 49-98499
Mar. 5, 1975 Japan .............................. 50-26738

[52] U.S. Cl. .................................. 340/279; 340/53; 180/99; 128/25
[51] Int. Cl.² ..................... B60K 28/00; B60T 7/14
[58] Field of Search .......... 340/279, 53; 180/82 R, 180/99; 235/92 MT, 92 GA, 92 CA; 128/2 S

[56] References Cited

UNITED STATES PATENTS

| | | | |
|---|---|---|---|
| 3,227,998 | 1/1966 | Platt | 180/99 X |
| 3,409,101 | 11/1968 | Williams | 180/99 X |
| 3,451,501 | 6/1969 | Applegate | 180/99 |
| 3,718,921 | 2/1973 | Johnson | 180/99 X |
| 3,794,968 | 2/1974 | Hill | 340/279 X |
| 3,877,541 | 4/1975 | Takeuchi et al. | 180/99 |
| 3,879,705 | 4/1975 | Binder et al. | 340/53 |
| 3,918,176 | 11/1975 | Abernathy et al. | 180/99 X |
| 3,922,665 | 11/1975 | Curry et al. | 180/99 X |

*Primary Examiner*—John W. Caldwell
*Assistant Examiner*—William M. Wannisky
*Attorney, Agent, or Firm*—Pollock, VandeSande and Priddy

[57] ABSTRACT

A method and apparatus for judging the psychosomatic condition of the driver in a motor vehicle, wherein engine-lock means are provided to control the ignition system of the engine. Prior to starting of the engine, the driver must go through a stationary adjusting task which is utilized to check the driver's mental and physical ability for maintaining a part of his body under a certain strained situation for a certain fixed time. Said ignition system of the engine cannot be made operative unless the driver passes through said stationary adjusting task.

13 Claims, 18 Drawing Figures

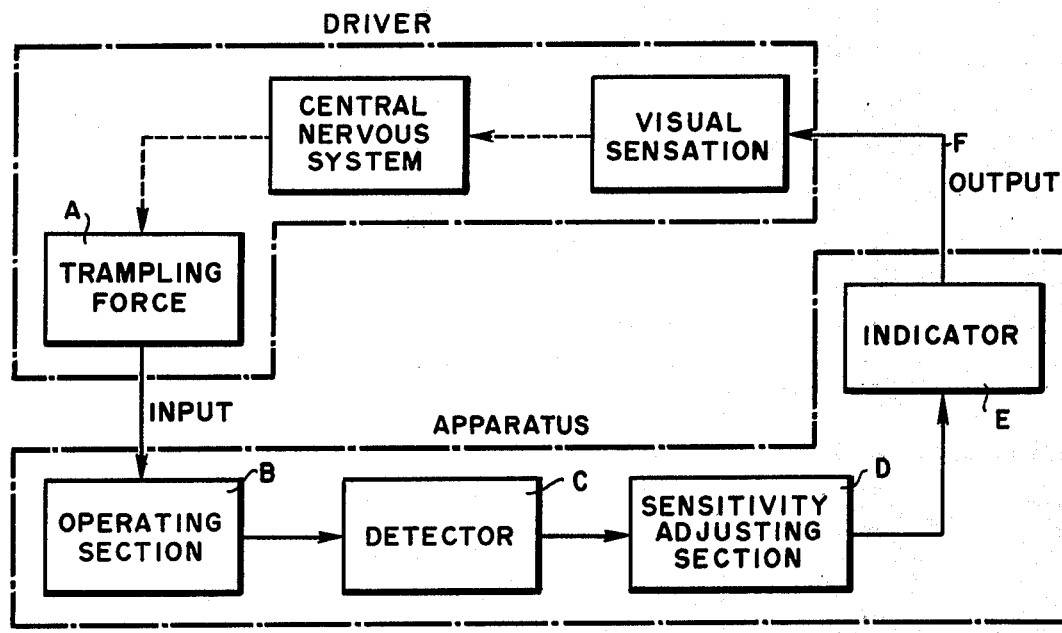
FIG. 1
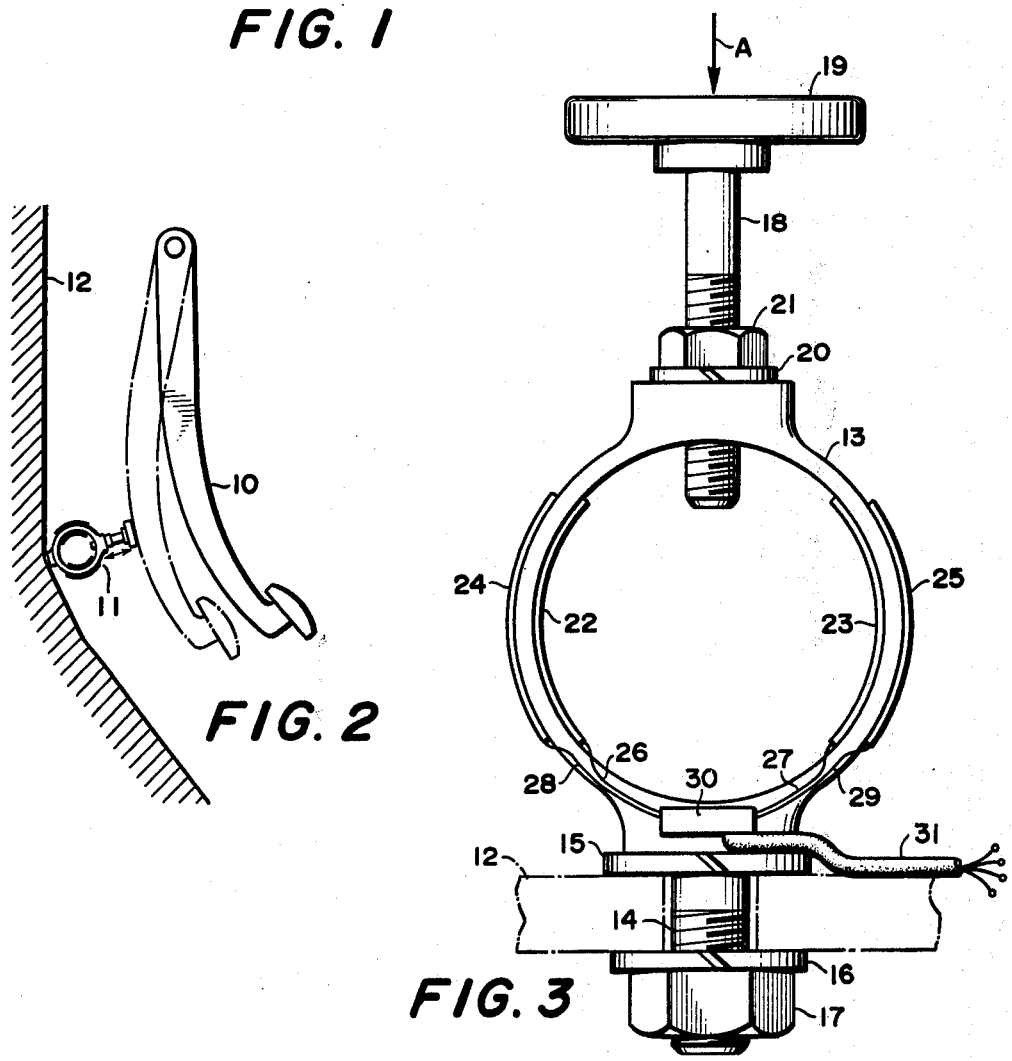
FIG. 2
FIG. 3

METHOD AND APPARATUS FOR JUDGING PSYCHOSOMATIC CONDITION OF THE DRIVER IN MOTOR VEHICLE

BACKGROUND OF THE INVENTION

The present invention relates to a method and apparatus for judging the psychosomatic condition of the driver in a motor vehicle and more particularly to a method and apparatus for judging whether the driver is capable of steering or not by checking both the driver's mental and physical response characteristics prior to starting of the engine in a motor vehicle by the driver.

When driving a vehicle such as a motor vehicle or the like, it is required that the driver be in stable and healthy condition both mentally and physically. There are many different factors which might cause reduction of driving ability. One of the most important factors involves drinking. Still another factor involves the driver's reduced physical health from overwork or sickness. Where driving ability has been deteriorated by means of the foregoing various factors, steering operations in a motor vehicle are extremely dangerous. It has been well recognized that many unfortunate traffic accidents are caused by these various factors.

Since conventional vehicles do not include an apparatus for judging psychosomatic condition, steering operations in a motor vehicle have actually been undertaken by many drivers who have abnormal conditions. Heretofore, some check systems for the psychosomatic condition have been proposed theoretically and experimentally. These prior techniques have not, however, been intended for practical in use because such prior systems contemplate very complicated check procedures on the driver and adoption of those prior techniques involve comparatively high manufacturing costs.

SUMMARY OF THE INVENTION

In view of the foregoing problem, the present invention has been devised. Accordingly, it is an object of the invention to provide a comparatively simple but reliable method and apparatus for judging whether the driver is capable of steering or not by checking both the driver's physical and mental response characteristics by means of a stationary adjusting task.

The present invention provides a method and apparatus for judging psychosomatic condition of drivers by utilizing a stationary adjusting task wherein the driver's stepping force with respect to a certain pressurizable foot-pedal placed on the floor of the driver's compartment must be maintained at a fixed level for a certain fixed time. Checking procedures imposed on the driver are quite easy and simple. In addition, a load-cell associated with this invention includes extremely sensitive detecting ability. Accordingly, this load-cell is preferable for judging psychosomatic condition of the driver. The high effectiveness of the invention is attained particularly in such a case as the driver himself does not become conscious of the reduction of his steering capable condition. The prevention of hazardous traffic accidents can be accomplished by using the judging system according to the invention which judges severely the psychosomatic condition of the driver.

In accordane with this invention, operation of the ignition system in a motor vehicle is controlled by an engine-lock circuit. Where the engine is under suspended state, the engine-lock circuit prevents the engine from starting thereof by locking the ignition system. When actuating the engine, the driver must go through the task according to the invention. Where the result of the task is satisfactory, locking operation of the engine lock-circuit is released, thereby the engine will be operative. Where the result of said task is judged unsatisfactory, locking of the ignition system is continued. Therefore, the engine cannot be made operative.

The invention utilizes both physical and mental response characteristics which are called a stationary adjusting task. This task is performed to check the ability of the driver to keep a part of his body in a certain strained state for a certain fixed time. Thus, the driving ability is detected by using the fact that the driver's ability to maintain such a strained state is reduced when his physical and mental stable state is disturbed. It has been found that the stationary adjusting task might be effective in order to detect psychosomatic condition of the driver through many different experiments. Alcohol concentration in blood which is a physical guide line of intoxication or drunkenness limit has considerable relationship with the test results, and drinkers who have high blood alcohol level can be detected in high rate considerably. Accordingly, it acknowledges that this stationary adjusting test is effective to prevent the steering operation by drinkers.

In accordance with this invention, the stationary adjusting task is to maintain the driver's trampling force with respect to the pressurizable foot-pedal in a predetermined tension state for a certain fixed time. Variation of trampling pressure on the foot-pedal is detected electrically and is indicated on an indicator provided in the driver's compartment of a motor vehicle. The indicator has a predetermined adjusting value, while the driver may adjust his trampling pressure on the foot-pedal statically so that the indicating value is at the adjusting value on the indicator. Variation of the trampling force is indicated as score points by means of the proper processing circuit. The psychosomatic condition of the driver is judged by comparing the said score points gained after the elapse of a certain fixed time with the reference preselected value of the indicator.

The preferred embodiment of the present invention will become apparent from the following detailed description when taken in conjunction with the accompanying drawings.

BRIEF DESCRIPTION OF THE DRAWINGS

FIG. 1 is a schematic block diagram illustrating a stationary adjusting task loop according to the invention;

FIG. 2 is a side elevational view of a foot-pedal and load-cell constituting a sensing unit provided in the driver's compartment;

FIG. 3 is a front view of a load-cell;

DETAILED DESCRIPTION OF THE INVENTION

Figure 4:
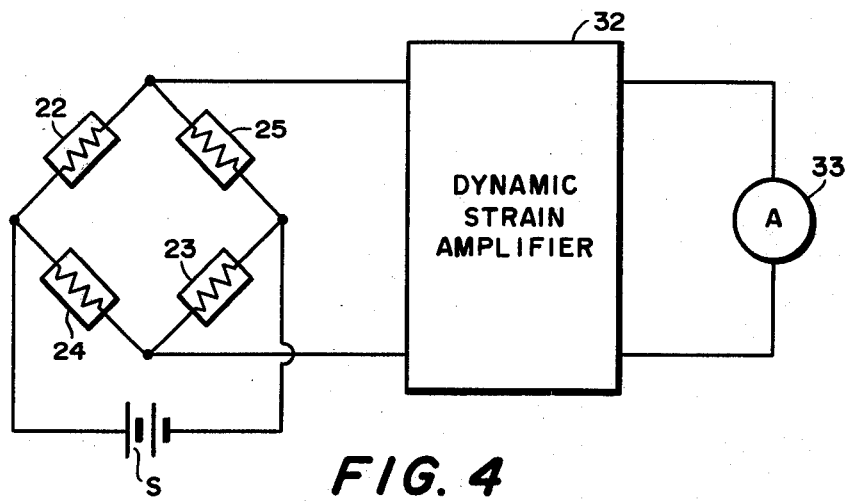
FIG. 4 is a schematic circuit diagram, partly shown in block form, of an apparatus according to the invention.

Referring now to the drawings, wherein the presently preferred embodiment of this invention is illustrated, FIG. 1 discloses a stationary adjusting task loop which includes the test apparatus according to this invention and the driver. An input trampling force A is applied by the driver on the foot-pedal which constitutes an operating section B of the apparatus. This trampling force is detected by the detector C electrically and is indicated on the indicator E via a sensitivity adjusting section D. The indiction of the trampling force is visually acknowledged by the driver as the output F of the apparatus. The driver makes an adjustment of the trampling force A on the foot-pedal by virtue of the function of his central nervous system so that said trampling force coincides with a predetermined adjusting value provided on the indicator E. The stationary adjusting task is made by such a loop described above, while the output of the apparatus is compared with said reference value thereby to judge the psychosomatic condition of the driver.

FIG. 2 is brief detail view illustrating an operating section B and a detecting section C of the type provided in the apparatus shown in FIG. 1. At the driver's seat, there is provided a foot-pedal 10 on which a trampling force of the driver is applied. A load-cell 11 constituting the detecting section is firmly attached to a toe board 12 adjacent this foot-pedal 10. The foot-pedal 10 is usually retained at the position shown by a solid line, so that the load-cell 11 is not influenced by the foot-pedal. When the stationary adjusting task is performed, the foot-pedal 10 is driven to the position shown by a dotted chain line as to press upon a contact terminal of the load-cell 11.

Referring to FIG. 3, there is described the construction of the load-cell 11 providing the detecting section. A body portion of the load-cell 11 may be made of a metallic elastic ring 13 that is elastically deformed by the external force A to be applied. In an outer peripheral portion of the elastic ring 13, one end of a stud bolt 14 is firmly embedded into the ring 13. The ring 13 is fixed to the toe board 12 by washers 15 and 16 and a nut 17 as shown in FIG. 3. An adjusting bolt 18 is mounted through the threaded portion formed in the opposite portion to the outer peripheral portion of the elastic ring 13. At the end of the adjusting bolt 18 is rigidly fixed a contact disc 19 which comes into contact with the aforementioned foot-pedal 10. The adjusting bolt 18 is suitably positioned in relation to the elastic ring 13 by a washer 20 and a nut 21. There are arranged four strain gauges 22 and 23 on the inner surface and 24 and 25 on the outer surface of the elastic ring 13, each of which is bonded to the ring 13, respectively. When the pedal effort is applied on the load-cell 11 in the direction shown by the arrow A, the elastic ring 13 is caused to deform elastically. As a result of this deformation, a compressive strain is applied to the strain gauges 22 and 23, and a tensile strain is applied to the strain gauges 24 and 25. Thus, the electric resistance of each of the strain gauges is changed. Strain gauges 22, 23, 24 and 25 are connected to terminals arranged in a block 30 which is mounted at the lower portion of the elastic ring 13 via lead wires 26, 27, 28 and 29 and also are connected to an external circuit via lead wires 31. Therefore, the driver's pedal effort on the foot-pedal 10 is converted into an electrical signal by the load-cell 11, which signal is rendered as the output. The selection of the position at which the foot-pedal 10 engages the load-cell 11 can be optionally adjusted by turning the adjusting bolt 18.

As illustrated in the drawings embodying the invention, each strain gauge is adhered on the elastic ring 13, but each gauge can be fixedly embedded beneath the surface of the ring 13. It is also preferable to protect the gauges by molding them.

The strain gauges 22, 23, 24 and 25 are electrically connected so as to form a bridge circuit shown in FIG. 4. A constant voltage is applied to this bridge circuit from an electric source such as a battery S in order to pick up electrical signals. The output of the bridge circuit may be adjusted by means of the dynamic strain amplifier 32 comprising the aforementioned sensitivity adjusting section and is indicated on the direct current meter 33 forming the aforementioned indicator section. The direct current meter is employed as the indicator instrument. It will be appreciated that the meter is capable of indicating electrical variations. Accordingly, a direct current voltage meter can be used in place of said direct current meter.

Figure 5:
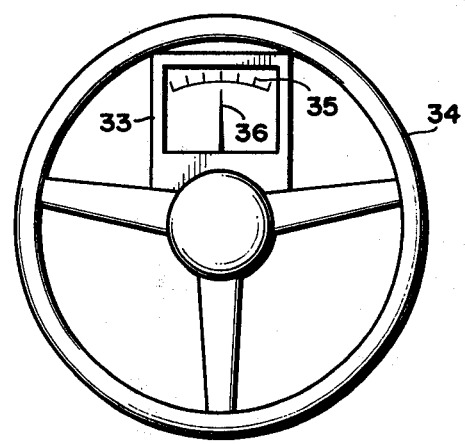
FIG. 5 is a view illustrating an indicator in the driver's compartment.

As shown in FIG. 5, the direct current meter 33 is mounted near the steering wheel 34. The meter 33 is so made that the operator can easily read out its indicated value. The direct current meter 33 has a scale indicating an adjusting value 35 which shows a stationary adjusting position. Alternative equivalent means can be utilized where no individual indicator such as 33 is provided. For example, another instrument such as a speed meter already installed in the motor vehicle can be utilized in lieu of said direct current meter 33.

When no trampling forces are applied on the load-cell 11, the resistance value of each strain gauge is preset so that the output of the bridge circuit is zero. In this case, it is advisable to insert adjusting variable resistances in the bridge circuit in order to achieve a balance condition thereof.

When a trampling force is furnished on the load-cell 11 by the driver's trampling operation against the foot-pedal 10, the resistance value of each strain gauge varies and, as a result an unbalance current flows in the bridge circuit. This output current is indicated on the direct current meter 33. The driver makes an adjustment of his trampling force on the foot-pedal so that the pointer 36 of the direct current meter 33 agrees with the adjusting value provided on the meter scale and comes to a standstill.

In order to simplify the apparatus, the foot-pedal 10, rather than being a separate pedal, may constitute one of the pre-existing operating pedals in the car such as a clutch pedal conventionally provided in an automobile. In such a case, the position where the clutch pedal engages with the load-cell 11 is selectively located at the position irrelevant to the engaging and disengaging operation of the clutch arrangement so that the usual operations of the clutch are not disturbed.

Hereinafter there is explained a judging circuit for judging psychosomatic condition of the operator in a motor vehicle by electrically processing the output of the apparatus which gives a prescribed stationary adjusting task.

Figure 6:
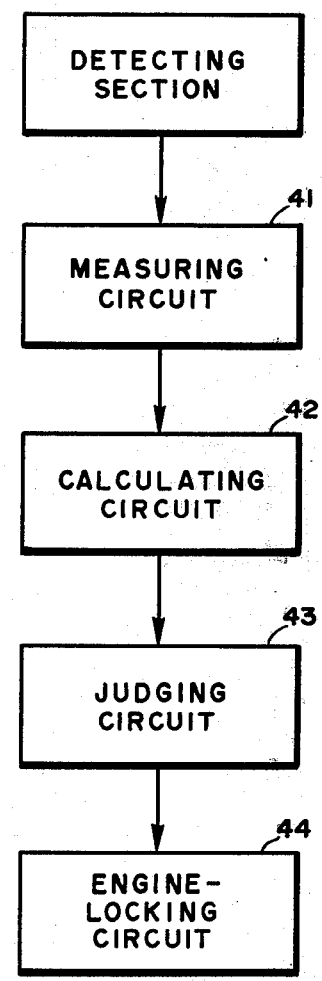
FIG. 6 is a schematic block diagram illustrating a processing circuit embodying the present invention.
Figure 9A:
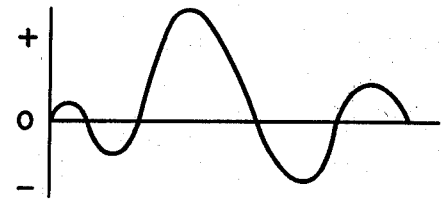
FIG. 9, consisting of 9A through 9F, is a series of wave-form graphs for each part of the circuit diagram of FIG. 8.
Figure 7A:
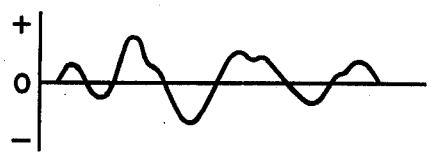
FIGS. 7A and 7B show a response wave-form graph relative to the block diagram of FIG. 6.
Figure 7B:
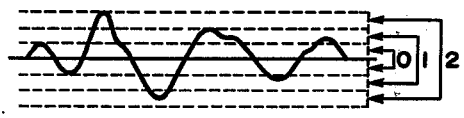

In FIG. 6, there is illustrated a preferred embodiment of the processing circuit. The output of the detecting section is given as a curve of response wave-form as shown in FIG. 7A. This curve shows a level variation of trampling force with respect to the reference value "zero" in which the ordinate of the curve is in terms of output current values and the abscissa is calibrated in time (seconds). This output is applied to a frequency rate measuring circuit 41 for counting the number of times the response wave-form passes through various level ranges preselected in the plus or minus direction to define the width of a certain fixed range of current values. In FIG. 7B, there is shown one example of the curve of response wave-form corresponding to said various ranges. The range zero indicates an allowable range. Therefore, the curve within zero range could not be an object for frequency rate measurement. FIG. 7B also illustrates ranges 1 and 2. Setting of ranges can be suitably selected. Frequency rate measurement is carried out for a predetermined time which is namely a certain fixed time to which the stationary adjustment task is to be imposed. Said time has been determined experimentally as preferably being in the order of 10 through 60 seconds.

In this manner, frequency rate in each range measured during a certain fixed time is weighted in each range by means of a calculating circuit 42. Total values of frequency rate are calculated in cooperation with said weighting, whereby the driver's response value can be obtained in the stationary adjustment task. Weighting coefficient of each range is selectively determined. Coefficients of the range far from the adjusting value are very great. When even once the curve is entered into this range, setting is made so that the response value is beyond the allowable value. The response value that is the output of calculating circuit 42 is fed to a judging circuit 43, while the response value is compared with the reference value provided in the judging circuit 43. Said reference value is determined experimentally and in all cases it shows a preferable guide line. If the removal of individual difference is, however, desired, it is the best way to change and set the reference value for each driver. This makes it possible to obtain a processing circuit suited to a certain driver.

When the response value is less than the reference value in the judging circuit 43, the output of said judging circuit 43 releases the locking action of an engine-locking circuit 44 so that the engine will be operative. However, when the response value is beyond the reference value, the locking action of engine-locking circuit 44 is not released. Accordingly, the engine in a motor vehicle can not be made operative.

Figure 8:
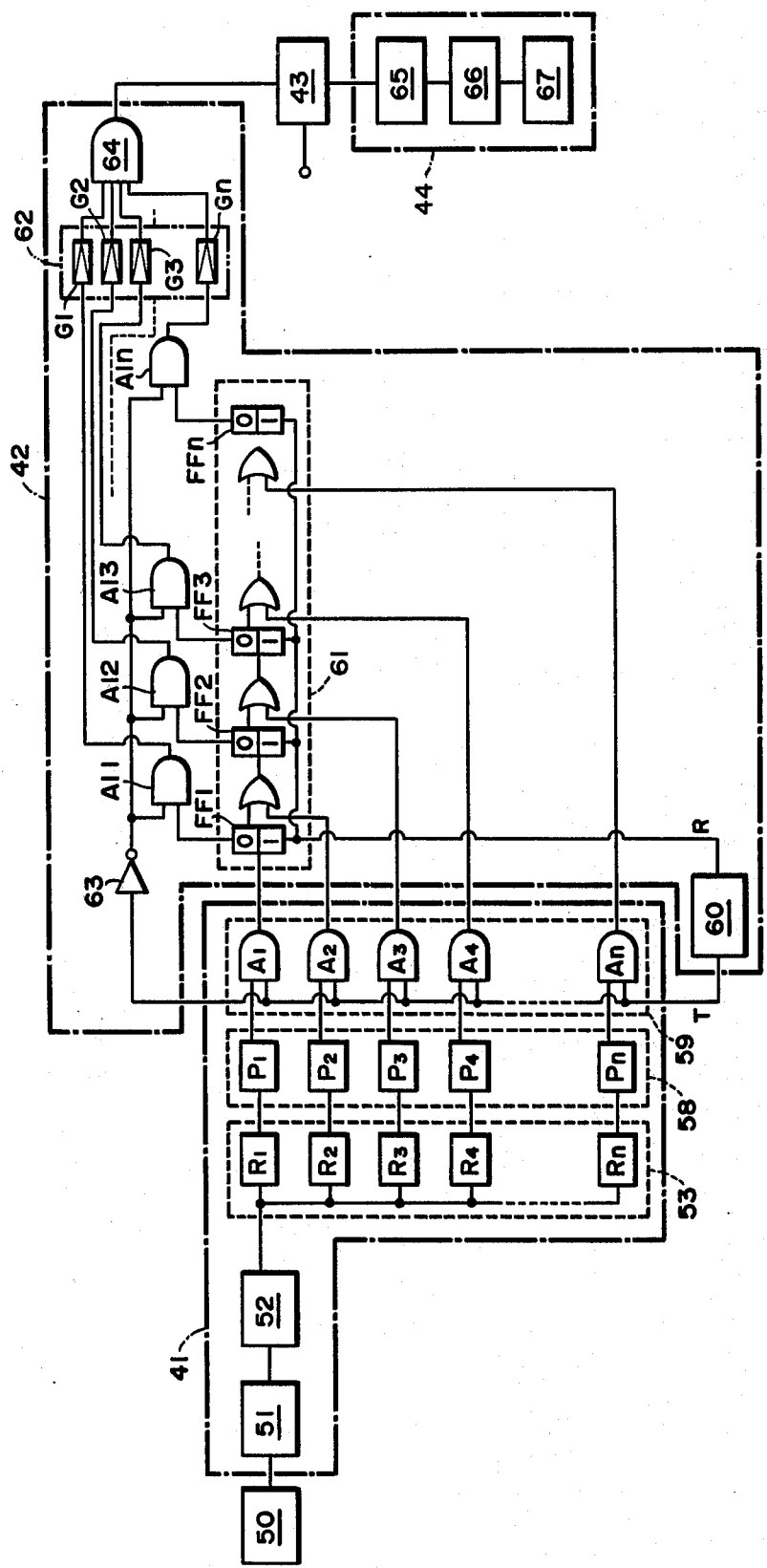
FIG. 8 is a schematic circuit diagram of a processing circuit embodying the present invention.

In FIG. 8, is illustrated a detailed embodiment of the processing circuit according to the invention and FIG. 9 shows wave-form curves for each part thereof. The output voltage derived from the detecting unit 50 such as a load-cell is shown as a response wave-form in FIG. 7A. As seen in FIG. 9A, this wave-form is amplified by the amplifier circuit 51 of the frequency rate measuring circuit 41. And then by setting the output voltage, which occurs when the pointer of the indicator exactly corresponds with the adjusting value, as a zero position, the negative portions of the wave-form of the output voltage are inverted by the inverter circuit 52 as shown in FIG. 9B. The output response wave-form of the inverter circuit 52 can be separated in each voltage range by a range separating circuit 53. This range separating circuit 53 comprises a plurality of relay units $R_1$, $R_2$, $R_3$, $R_4$, ... $R_n$ arranged with respect to each voltage range. As best seen in FIG. 9B, the inverted wave-form is separated into several ranges designated 0 through 4. Range 0 indicates an allowable range given to the driver. Where the response wave-form is within this range, said wave-form could not be an object for frequency rate measurement. In the case which the voltage of a zero position in FIG. 7A is set as 5.0 volt, range 1 corresponds to the operation of relay unit $R_1$ which is, for example, set in the range of 5.2 to 5.3 volt. In a similar manner, range 2 is set in the range of 5.3 to 5.4 V and range 3 5.4 to 5.5 V and range 4 5.5 to 5.6 V. Respective ranges correspond to the operation of relay units $R_1$, $R_2$, $R_3$ and $R_4$. Naturally, the number of ranges, and the voltage variation defining each range, can be suitably selected.

Figure 9B:
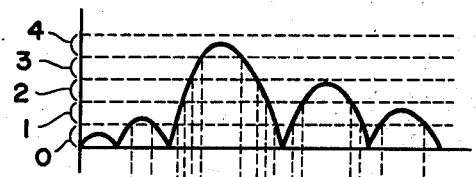
Figure 9C:
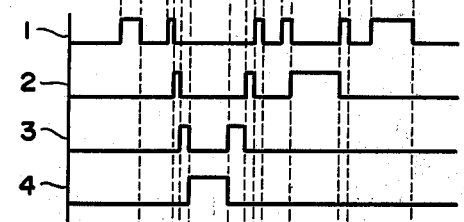
Figure 10:
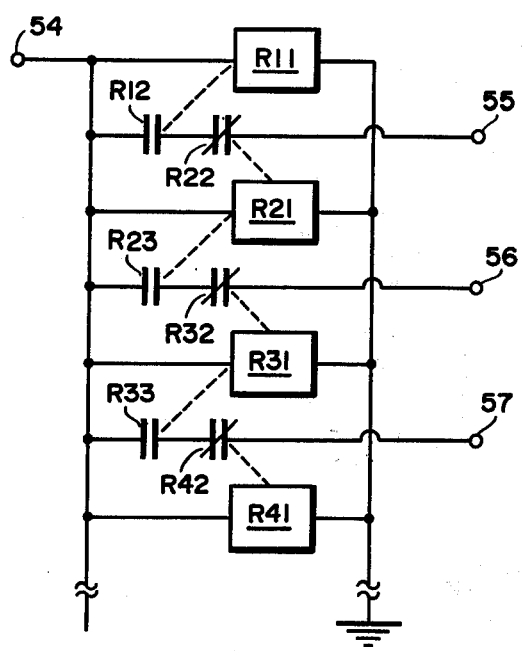
FIG. 10 is a circuit diagram illustrating the main part of a range separating circuit shown in FIG. 8.

In FIG. 10, is illustrated a preferred wiring diagram of range separating circuit 53. The relay unit $R_1$ includes a relay coil $R_{11}$ which is operated by the applied voltage beyond 5.2 V relative to the switching operation of contact, and normally open contact $R_{12}$. Similarly, the relay unit $R_2$ includes a relay coil $R_{21}$ which is operated by the applied voltage beyond 5.3 V relative to the switching operation of contact, and normally closed contact $R_{22}$, and normally open contact $R_{23}$. The relay unit $R_3$ also includes a relay coil $R_{31}$ which is operated by the applied voltage beyond 5.4 V relative to the switching operation of contact, and normally closed contact $R_{32}$, and normally open contact $R_{33}$. The relay unit $R_4$ includes a relay coil $R_{41}$ which is operated by the applied voltage beyond 5.5 V relative to the switching operation of contact, and normally closed contact $R_{42}$. The range separating circuit 53 is made of a prescribed constitution. The output of the inverter circuit 52 is fed to an input terminal 54. Where the applied voltage is less than the allowable range, electrical signals can not be derived from output terminals 55, 56 and 57 by means of the operation of normally open contacts $R_{12}$, $R_{23}$ and $R_{33}$. In case of range 1 whose applied voltage involves 5.2 to 5.3 V, the output is given from the output terminal 55 since the contact $R_{12}$ is closed. Then, in case of range 2 whose applied voltage involves 5.3 to 5.4 V, the output from the output terminal 55 is interrupted since the contact $R_{22}$ is opened and at the same time the output is obtained from the output terminal 56 since the contact $R_{23}$ is closed. In the same manner, in case of range 3 the output is only derived from the output terminal 57. For this reason, the output of range separating circuit 53 is given as a pulse-shaped wave-form having time width corresponding to each range as shown in FIG. 9C.

The output pulse of the range separating circuit 53 is applied to a pulse generating circuit 58 in order to be converted into a pulse having a certain fixed width which is suitable for counting operation. The pulse generating circuit 58 comprises a plurality of pulse generators $P_1$, $P_2$, ... $P_n$ arranged with respect to the respective relay units $R_1$, $R_2$, ... $R_n$, and circuit 58 detects the trailing portion of the output pulse from the range separating circuit 53 as shown in FIG. 9C and produces the pulse wave-forms shown in FIG. 9D. Finally the response wave-form is converted into pulses which correspond to the frequency rate at which the wave-form curve passes through the several level ranges.

Figure 9D:
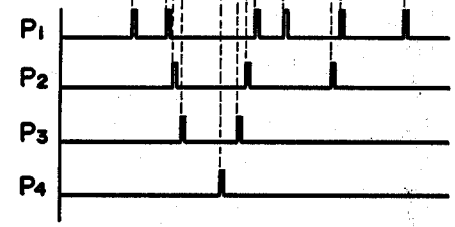
Figure 9E:
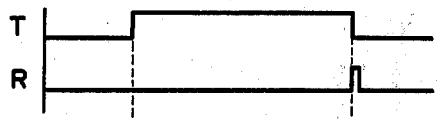
Figure 9F:
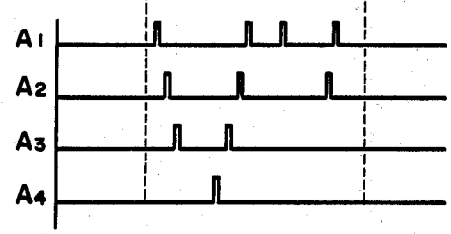

Frequency rate pulses obtained in such a manner can be processed as effective signal only within a predetermined time. For this reason, the output pulse of the pulse generating circuit 58 is fed to AND circuit 59. Since in connection with a plurality of AND gates $A_1$, $A_2$, ... $A_n$ constituting AND circuit 59 its open time is determined by a timer circuit 60, frequency pulses for a certain fixed time are supplied to the following counting circuit 61. In FIG. 9E, signals T to open AND circuit 59 are furnished to respective AND gates $A_1$, $A_2$, ... $A_n$ by the timer circuit 60 only for a predetermined time in which the stationary adjusting test is applied, i.e., 10 to 60 seconds.

Where the frequency pulses (shown in FIG. 9F) obtained in such a manner are weighted in each level range, the condition of the operator is to be indicated numerically. While there are various methods for this weighting operation, the operation can be made by the carrying operation of the counting circuit 61 and by the change of amplification factor of the amplifier circuit 62 in the embodiment illustrated. The counting circuit 61 at least includes flip-flop circuits $FF_1$, $FF_2$, ... $FF_n$ greater than stages corresponding to the number of AND gates $A_1$, $A_2$, ... $A_n$ and OR circuits located between respective flip-flop circuits. The first flip-flop circuit $FF_1$ receives an output pulse from AND gate $A_1$, and the following flip-flop circuits $FF_2$, ... $FF_n$ receive output pulses from AND gates $A_2$, ... $A_n$ and the output of previous flip-flop circuit. As indicated in the embodiment according to the invention, since the counting circuit 61 is made in the form of binary $n$ bit counter, the weighting operation of $2^{n-1}$ ($n$ is the number of level ranges 1, 2, 3, ... $n$) is accomplished by its carrying operation. Before the stationary adjusting task is begun, every flip-flop of counting circuit 61 is set to 0 at the upper portion thereof and is set to 1 at the lower portion thereof as shown in FIG. 8. As seen in FIG. 9E, this initial state is accomplished by a reset pulse R which is applied to the respective flip-flop circuits from the timer circuit 60 immediately after the sampling time T has passed. A pulse corresponding to the range 1 rendered from gate $A_1$ is applied to flip-flop $FF_1$ to invert the upper portion thereof into 1 and the lower portion thereof into 0. $FF_1$ 1 possesses a weight equivalent to $2^0 = 1$ and in analogous fashion $FF_2$ possesses a weight of 2, $FF_3$ a weight of 4 and $FF_4$ a weight of 8. For example, where a second pulse is supplied to flip-flop $FF_1$ it is inverted again to return into a reset state shown in FIG. 8. At this time flip-flop $FF_1$ provides an inverse signal to the following flip-flop $FF_2$ via OR gate circuit to effect a carrying operation. In such a manner, the task result of the driver in a motor vehicle is held in the counting circuit 61. Holding values of all flip-flop circuits are supplied to the amplifier circuit 62 via AND gates $A_{11}$, $A_{12}$, $A_{13}$, ... $A_{1n}$. During the counting operation of the counting circuit 61, AND gates $A_{11}$, $A_{12}$, ... $A_{1n}$ are closed because signal T of the timer circuit 60 is fed thereon via NOT gate 63. However, said AND gates are opened in response to a disappearance of signal T. Holding values maintained in the counting circuit 61 at that time are supplied to respective amplifiers $G_1$, $G_2$, ... $G_n$ of the amplifier circuit 62. Said all amplifier $G_1$, $G_2$, ... $G_n$ have characteristics where their amplification factors are increased in turn respectively. In this stage the weighting operations relative to voltage values are taken in each level range.

The output voltages of the amplifier circuit 62 are added therebetween by means of an adding circuit 64 to obtain response values of the driver in a motor vehicle. These response values are compared with the reference value by using the judging circuit 43. Only where the said values are less than the reference value, the judging circuit 43 transmits a lock release signal to the engine-lock circuit.

The engine-lock circuit 44 includes a power amplifier 65, a relay circuit 66, and an engine-lock device 67, while the engine in a motor vehicle will be operative by the lock release signal supplied from the judging circuit 43.

The engine-lock device 67 is not shown in detail. The arrangement for connecting the relay circuit to the starter switch of engine is preferable.

In addition, where the mental and physical condition of the driver is abnormal, an alarm device can be added to notice the task result toward the driver.

Figure 11:
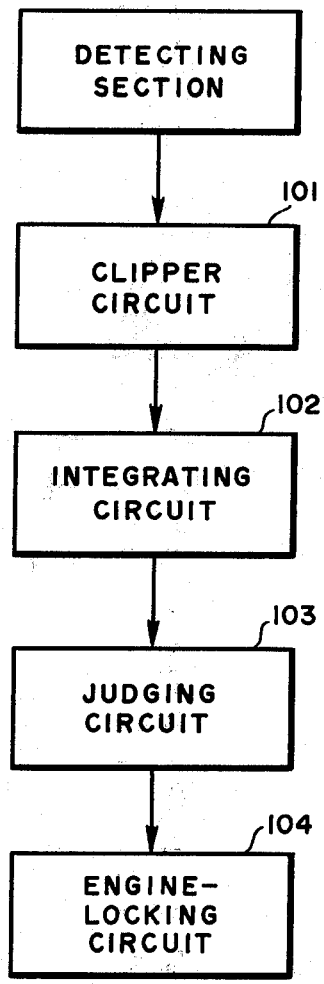
FIG. 11 is a schematic block diagram of another modification of processing circuit embodying the invention.

In FIG. 11, there is illustrated another modification of the processing circuit according to the invention. This embodiment is similar to the embodiment shown in FIG. 6. The blocks designated by reference numerals 102, 103 and 104 correspond to those designated by numerals 42, 43 and 44 shown in FIG. 6, respectively. Therefore, the description of the portion representative of the same construction can be abbreviated. In the modification, the output of the detecting section can be obtained as a wave-form beyond the predetermined value by the use of the clipper circuit 101.

Figure 12:
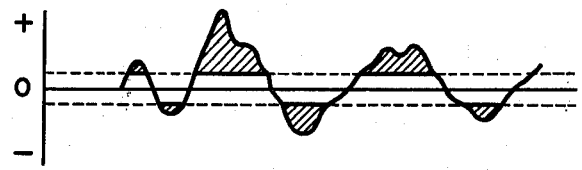
FIG. 12 is a response wave-form graph relative to a block diagram of FIG. 11.

In FIG. 12, there is illustrated one example of a response wave-form for the circuit of FIG. 11. The cross-hatched portions beyond the dotted line indicative of the predetermined value are derived from the clipper circuit 101. The output of the clipper circuit 101 is integrated in the integrating circuit 102. This integrated output is applied to the judging circuit 103, and the output thereof is thereafter processed in a similar manner with the embodiment shown in FIG. 6.

As will be obvious from the above description, in operating a motor vehicle if the driver does not pass the stationary adjusting task he can not actuate the engine in a motor vehicle in accordance with the invention. Therefore, the prevention of hazardous or dangerous driving such as drunken driving is accomplished in advance.

In a method and apparatus for judging psychosomatic condition, the driver is only required to perform a foot-pedal stepping operation. Furthermore, it is possible to employ a pre-existing clutch pedal as the foot-pedal. Consequently, various superior effects can be attained readily in accordance with the invention.

It is to be understood that this invention is not limited to the specific embodiment disclosed herein but is capable of modifications falling within the scope of the appended claims. Having thus described a selected embodiment of the present invention, the invention itself is claimed as follows.

What is claimed is:

1. An apparatus for judging the psychosomatic condition of the driver in a motor vehicle by requiring the driver to perform the stationary adjusting task of maintaining his foot pressure at a predetermined fixed level for a predetermined time interval, comprising a pedal in the driver's compartment of the motor vehicle, a pressure sensitive detector coupled to said pedal and operative to produce an electrical signal representative of the pedal force being exerted by the driver, an indicator visible to the driver in said driver's compartment and responsive to said signal for providing an indication of the pedal force being exerted by the driver, said indicator including a scale having a fixed indication thereon visible to the driver and representative of the predetermined fixed level of pedal force which is to be maintained by the driver, and a processing circuit including timer means defining said predetermined time interval, said processing circuit further including means for comparing the output signal of the detector with a preset fixed reference value during said predetermined time interval.

2. The apparatus of claim 1 including an engine-lock circuit, and means coupling said processing circuit to said engine-lock circuit to control the activation of the motor vehicle engine in dependence upon the results of said comparison.

3. The method of judging the psychosomatic condition of the driver of an automobile by use of an apparatus comprising a foot pedal having an associated pressure detector operative to produce an electrical signal representative of the force imposed on said foot pedal, and an electrical metering device responsive to said electrical signal, said metering device having a movable pointer to indicate the foot pressure being applied to said pedal and also having a fixed index in the path of movement of the pointer, said method comprising the stationary adjusting task performed by said driver of applying foot pressure to said pedal for a predetermined time interval while the driver observes the pointer of said metering device in an effort by said driver to maintain his applied foot pressure at the predetermined fixed level designated by said fixed index throughout said predetermined time interval, and monitoring the amplitude of said electrical signal throughout said predetermined time interval to determine the extent to which said signal amplitude departs from a predetermined fixed reference level.

4. The method of claim 3 wherein said monitoring step includes the steps of defining a plurality of fixed signal amplitude levels which are successively displaced from said reference level, and counting the number of times said signal amplitude passes through each of said fixed amplitude levels during said predetermined time interval.

5. An apparatus for judging the psychosomatic condition of the driver in a motor vehicle comprising in combination an engine-lock circuit; a pedal located in the driver's compartment of the motor vehicle; a detector for electrically detecting a pedal effort by the driver; an indicator in said driver's compartment for indicating the output of said detector; and a processing circuit for controlling said engine-lock circuit by comparing the output of said detector with a predetermined reference value, said processing circuit comprising a frequency rate measuring circuit for counting the number of times a response wave-form passes through various preselected level ranges, a calculating circuit for providing a weight to each range and for calculating values of frequency rate, and a judging circuit for comparing the output of said calculating circuit with said predetermined reference value in order to get a releasing signal for said engine-lock circuit when said output is less than said reference value.

6. A judging apparatus as recited in claim 5 wherein said detector comprises a metallic elastic ring adapted to be deformed by an external force applied thereto upon operation of said pedal; and strain gauges respectively bonded on the outer and inner surfaces of the ring and interconnected to one another to form a bridge circuit.

7. A judging apparatus as recited in claim 6, further including an adjusting bolt mounted on said ring for adjusting the contact position between the ring and the bolt.

8. A judging apparatus as recited in claim 5, wherein said pedal is the clutch pedal of the motor vehicle.

9. A judging apparatus as recited in claim 5, where said frequency rate measuring circuit comprises a range separating circuit for separating response waveform signals obtained from the detector into a plurality of predetermined level ranges; a pulse generating circuit having a plurality of pulse generators to convert the output pulse from the range separating circuit into a pulse having a certain fixed pulse width; the an AND circuit having a plurality of AND gates connected with said pulse generating circuit to determine the time of a stationary adjusting task.

10. A judging apparatus as recited in claim 9, wherein said range separating circuit includes a plurality of relay units operated by different voltages respectively.

11. A judging apparatus as recited in claim 5, wherein said calculating circuit comprises a counting circuit having flip-flop circuits which form a binary $n$ bit counter; and an amplifier circuit having a different amplification factor for each flip-flop.

12. A judging apparatus as recited in claim 5, wherein the frequency rate measuring circuit includes a clipper circuit.

13. A judging apparatus as recited in claim 5, wherein said calculating circuit includes an integrating circuit.

* * * * *